UNITED STATES PATENT OFFICE.

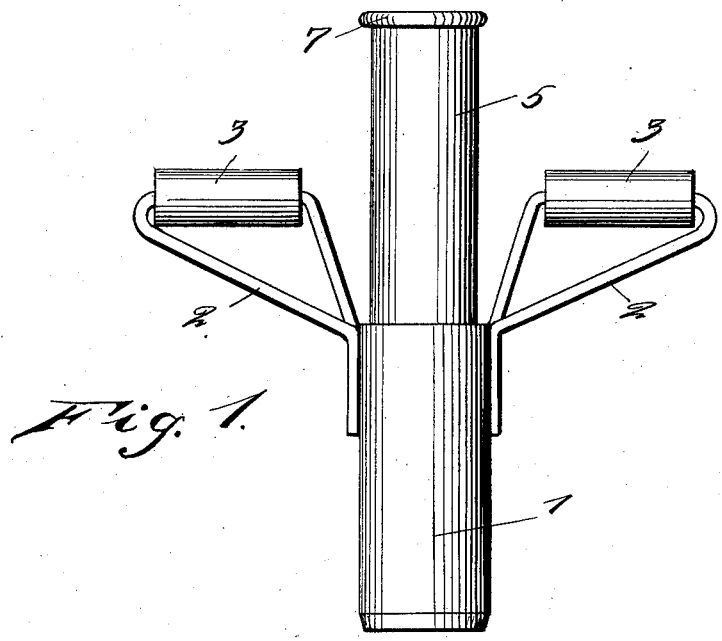
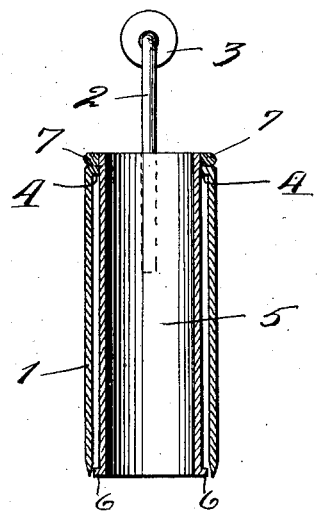
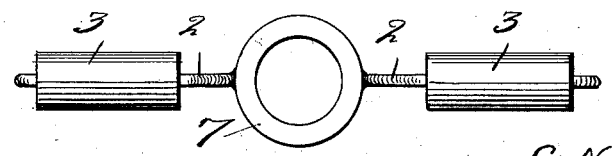

CHARLES N. WEAVER, OF COVINA, CALIFORNIA.

TRANSPLANTER.

1,044,109.   Specification of Letters Patent.   Patented Nov. 12, 1912.

Application filed March 12, 1912. Serial No. 683,194.

*To all whom it may concern:*

Be it known that I, CHARLES N. WEAVER, a citizen of the United States, residing at Covina, in the county of Los Angeles and State of California, have invented certain new and useful Improvements in Transplanters, of which the following is a specification.

The present invention relates to a device which may be termed a "transplanter".

An important object of my invention is to provide a device of the above mentioned character, which may be employed, first, to form an opening or hole in the ground, second, to dig up the plant without destroying or breaking up the soil which holds the roots, and third, to safely place such soil carrying the roots and plant in the previously formed opening or hole.

A further object of my invention is to provide means of the above mentioned character, which are simple in construction, cheap to manufacture, and easy to operate.

Other objects and advantages of the invention will be apparent during the course of the following description.

In the accompanying drawings forming a part of this specification and in which like numerals are employed to designate like parts throughout the same, Figure 1 is a side view of the device, showing the telescoping tubes in their distended position. Fig. 2 is a central transverse sectional view through the same, the telescoping tubes being collapsed, and, Fig. 3 is a plan view of the same.

In the drawings wherein for the purpose of illustration, I have shown a preferred embodiment of my invention, the numeral 1 designates an outer cutting casing or tube, which may be cylindrical or of any other suitable shape. This outer cutting casing or tube has its lower end sharpened, as shown, so that it may be easily forced into the ground or soil. Attention is called to the fact that the outer cutting casing 1 has its lower sharpened end beveled upon its inner and outer sides. The function of having the inner side beveled is to compress the soil containing the roots of the plant, whereby such soil is more firmly held together. Rigidly connected with the upper end of the cutting casing or tube 1 are preferably diametrically arranged handles 2. These handles may preferably be in the form of open frame, carrying hand-grips 3. The handles 2 may be soldered or otherwise connected with the casing 1.

The outer cutting casing or tube 1 is provided at its upper end with an inwardly extending flange 4, to snugly receive an inner removing casing or tube 5, which telescopes the outer cutting casing 1, as shown. In order that the casings 1 and 5 may not be entirely separated by a relative movement of said casings in one direction, the casing 5 is provided at its lower end with an outwardly extending flange 6, which fits snugly within the casing 1 and is adapted for movement into engagement with the flange 4. The width of the flange 6 also aids the casing 5 in removing the soil contained in the outer cutting casing 1, as will be apparent hereinafter. The inner removing casing or tube 5 has an outwardly extending flange 7 rigidly connected with its upper end, which prevents the entire separation of the casings 1 and 5 by a relative movement in one direction.

It is to be understood that I may construct my device in different sizes, depending upon the character of the work which is to be done. Although I have shown the casings 1 and 5 as cylindrical, I do not wish to restrict myself in any way to this shape, as just as good results may be obtained by making them square in cross-section, elliptical, etc.

In the use of the device, the removing casing or tube 5 is elevated to assume its distended position, as shown in Fig. 1. The operator takes hold of the handles 2, with his two hands and holds the removing casing 5 in its distended position, pressing against the same with the thumb or other fingers. The outer cutting casing or tube 1 is now positioned so that its lower sharpened end engages the ground or soil within which it is desired to transplant the plant. Pressure is now exerted upon the handles 2 for forcing the outer cutting casing 1 into the ground or soil a suitable distance according to the desired depth of the hole or opening which is to be dug. The outer cutting casing is now removed, whereby the opening or hole is formed. The operator now presses down upon the removing casing or tube 5 with the thumb or other fingers, whereby the soil contained in the casing 1 will be forced out of the same. The removing casing or tube 5 is again moved to its distended position and the casings 1 and 5 are placed about the plant to be dug up, such plant extending upwardly within the casings 1 and 5. It is thus seen that the plant will not be in any way injured. Pressure is now exerted upon the handles 2 for forcing the cutting casing 1 a suitable distance into the soil. The entire device is then raised and the soil containing the roots of the plant will remain in the cutting casing 1. The soil will not be broken up or otherwise disturbed. The cutting casing 1 is then positioned adjacent the previously formed opening and the removing casing or tube 5 is moved downwardly whereby the soil in the casing 1 surrounding the roots is forced into such previously formed opening. In this way the plant is dug up, and set out without having the soil about its roots broken or disturbed.

It is to be understood that the form of my invention herewith shown and described is to be taken as a preferred example of the same and that certain changes in the shape, size, and arrangement of parts may be resorted to without departing from the spirit of the invention or the scope of the subjoined claims.

Having thus described my invention, I claim:—

1. A transplanter of the character described, comprising an outer cutting casing having its lower end sharpened and its upper end provided with an inwardly extending annular flange, an inner removing casing reciprocating within the outer casing and having a considerably smaller diameter than the same, an outwardly extending annular flange carried by the lower end of the inner removing casing and fitting snugly within the outer cutting casing, and adapted to engage the inwardly extending annular flange carried by said outer casing at the upper end thereof to prevent the complete separation of the inner and outer casings, a flange carried by the upper end of the inner casing, and substantially diametrically arranged handles attached to the upper portion of the outer casing.

2. A transplanter of the character described, comprising an outer casing having its inner surface at the end thereof beveled to provide a sharp cutting end having a greater interior diameter than the interior diameter of the remainder of the outer casing, whereby said casing will cut the portion of earth around the plant's root with a slightly greater diameter than the interior diameter of the outer casing so that the portion of earth will be properly packed and prevented from being broken, an inner casing reciprocating within the outer casing and of a much smaller diameter than said outer casing, an annular flange formed upon the lower end of the inner casing, and extending outwardly to slidably engage the inner surface of the outer casing, an annular flange formed upon the upper end of the outer casing and extending inwardly to slidably engage the outer surface of the inner casing, an annular flange formed upon the upper end of the inner casing, and substantially diametrically arranged handles attached to the outer casing.

In testimony whereof I affix my signature in presence of two witnesses.

CHARLES N. WEAVER.

Witnesses:
J. K. STROSNIDER,
F. H. FABRICK.

Copies of this patent may be obtained for five cents each, by addressing the "Commissioner of Patents, Washington, D. C."